(12) United States Patent
Koppelman et al.

(10) Patent No.: US 8,783,624 B2
(45) Date of Patent: Jul. 22, 2014

(54) LAMINAR FLOW PANEL

(75) Inventors: Henry J. Koppelman, Seattle, WA (US); Paul S. Gregg, Seattle, WA (US)

(73) Assignee: The Boeing Company, Chicago, IL (US)

( * ) Notice: Subject to any disclaimer, the term of this patent is extended or adjusted under 35 U.S.C. 154(b) by 170 days.

(21) Appl. No.: 12/856,667

(22) Filed: Aug. 15, 2010

(65) Prior Publication Data

US 2012/0037760 A1 Feb. 16, 2012

(51) Int. Cl.
*B64C 21/06* (2006.01)

(52) U.S. Cl.
USPC ........................................ 244/209; 244/200.1

(58) Field of Classification Search
USPC .............. 244/130, 198, 200, 200.1, 208–210, 244/214
See application file for complete search history.

(56) References Cited

U.S. PATENT DOCUMENTS

| | | | | |
|---|---|---|---|---|
| 3,097,817 | A * | 7/1963 | Towzey, Jr. ........................ | 244/15 |
| 4,993,663 | A | 2/1991 | Lahti et al. | |
| 5,167,387 | A * | 12/1992 | Hartwich ........................ | 244/200 |
| 5,366,177 | A * | 11/1994 | DeCoux ........................ | 244/201 |
| 5,590,854 | A * | 1/1997 | Shatz ............................. | 244/206 |
| 6,216,982 | B1 * | 4/2001 | Pfennig et al. ................ | 244/130 |
| 7,152,829 | B2 * | 12/2006 | Bertolotti ...................... | 244/209 |
| 8,459,597 | B2 * | 6/2013 | Cloft et al. .................... | 244/208 |
| 2009/0212165 | A1 * | 8/2009 | Parikh .......................... | 244/209 |
| 2010/0116943 | A1 * | 5/2010 | Meister ......................... | 244/208 |
| 2010/0294893 | A1 * | 11/2010 | Heintze et al. ................ | 244/219 |
| 2011/0006165 | A1 * | 1/2011 | Ireland ......................... | 244/200.1 |
| 2011/0168843 | A1 * | 7/2011 | Calder .......................... | 244/134 B |
| 2011/0168852 | A1 * | 7/2011 | Porte et al. .................... | 244/53 B |
| 2011/0198444 | A1 * | 8/2011 | Dong ............................. | 244/130 |
| 2012/0037760 | A1 * | 2/2012 | Koppelman et al. ........... | 244/209 |
| 2012/0043428 | A1 * | 2/2012 | Goelling et al. ............... | 244/208 |
| 2012/0085867 | A1 * | 4/2012 | Bardwell ...................... | 244/134 B |

OTHER PUBLICATIONS

High Reynolds No. HLFC Flight Experiment on B-757, vol. III—Leading Edge Design, Fabrication and Installation. Boeing Commercial Airplane Group, Report D6-55648-3, Nov. 1992.
F-16XL-2 SLFC Flight Experiment: NASA TP-1999-209683, S. G. Anders and M. C. Fischer, Dec. 1999.
Boeing Commercial Airplane Group, "High Reynolds Number HLFC Flight Experiment III. Leading Edge Design, Fabrication, and Installation", NASA/CR-1999-209325 , Apr. 1999, pp. 9-17, 49, and 51-52.
S. G. Anders and M. C. Fischer, "F-16XL-2 Supersonic Laminar Flow Control Flight Test Experiment", NASA TP-1999-209683, Dec. 1999, pp. 12-13, and 163-168.

* cited by examiner

*Primary Examiner* — Philip J Bonzell
*Assistant Examiner* — Timothy Schwarz
(74) *Attorney, Agent, or Firm* — Ameh IP; Elahe Toosi; Lowell Campbell

(57) ABSTRACT

An aerodynamic body operable to both promote laminar flow and satisfy structural requirements is disclosed. A perforated panel skin comprises an inner surface and an outer surface of the aerodynamic body. At least one hollow member is coupled to the inner surface and is operable to suction air from the outer surface and through the perforated panel skin. The at least one hollow member is oriented in a substantially chordwise direction relative to an airflow over the aerodynamic body.

20 Claims, 9 Drawing Sheets

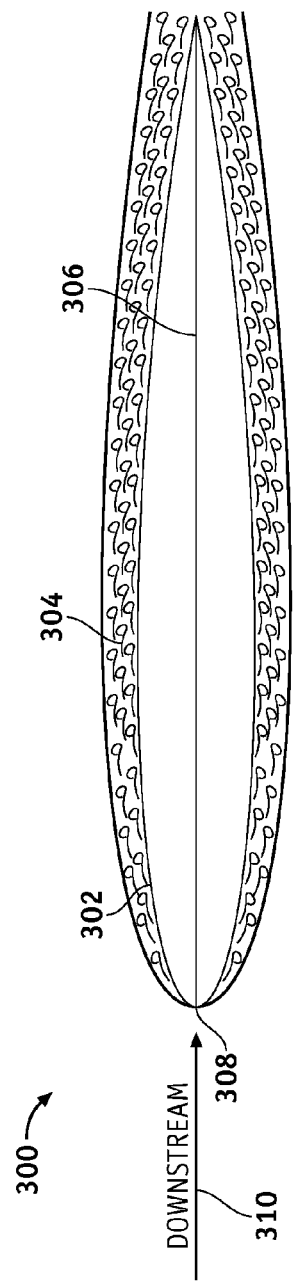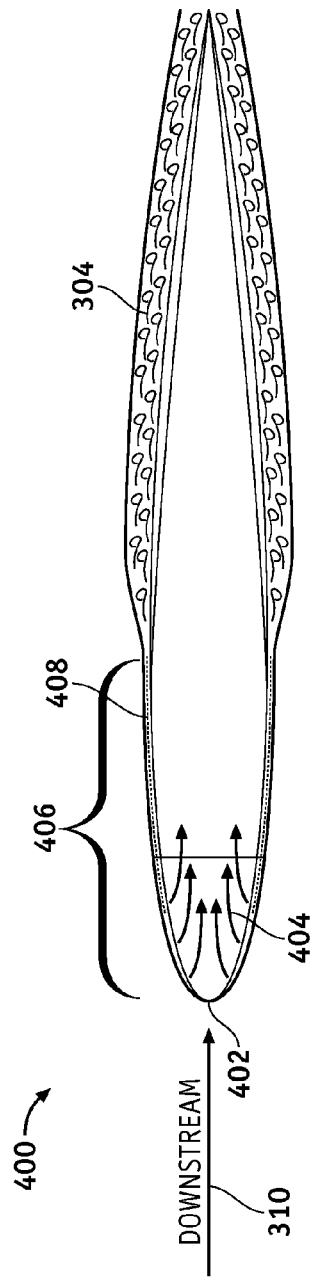

LAMINAR FLOW PANEL

FIELD

Embodiments of the present disclosure relate generally to aerodynamic surfaces. More particularly, embodiments of the present disclosure relate to aerodynamic surfaces providing laminar flow.

BACKGROUND

Laminar flow comprises, for example but without limitation, a smooth low turbulence flow of air over a contour of parts of an aircraft such as wings, fuselage, and the like. The term laminar flow is derived from a process where layers of air are formed one next to the other in formation of a boundary layer. Interruption of a smooth flow of boundary layer air over a wing section can create turbulence, which may result in non-optimal lift and/or non-optimal drag. An aerodynamic body designed for minimum drag and uninterrupted flow of the boundary layer may be called a laminar aerodynamic surface. A laminar aerodynamic surface may maintain an adhesion of boundary layers of airflow as far aft of a leading edge as practical. On non-laminar aerodynamic bodies, a boundary layer may be interrupted at high speeds and result in turbulent flow over a remainder of the non-laminar aerodynamic surface. This turbulent flow may be realized as drag, which may be non-optimal.

SUMMARY

An aerodynamic body operable to both promote laminar flow and satisfy structural requirements is disclosed. A perforated panel skin comprises an inner surface and an outer surface. The outer surface comprises a leading edge of the aerodynamic body. The inner surface is stiffened by at least one hollow member coupled thereon. The at least one hollow member is oriented in a substantially chord-wise direction relative to an airflow over the aerodynamic body and is operable to suction air from the outer surface.

In a first embodiment, an aerodynamic body comprises a perforated panel skin comprising an outer surface and an inner surface of the aerodynamic body. The aerodynamic body further comprises at least one hollow member coupled to the inner surface and operable to suction air from the outer surface through the perforated panel skin. The at least one hollow member is oriented in a substantially chord-wise direction relative to an airflow over the aerodynamic body.

In a second embodiment, a method provides a corrugation-stiffened structure. The method provides a perforated panel skin comprising an outer surface and an inner surface of an aerodynamic body. The method further provides a stiffener comprising at least one hollow member coupled to the inner surface, and orients the at least one hollow member in a substantially chord-wise direction relative to an airflow over the aerodynamic body.

In a third embodiment, a method provides laminar flow over an aerodynamic body. The method stiffens an inner surface of a perforated panel skin of the aerodynamic body with at least one hollow member coupled to the inner surface. The method further orients the at least one hollow member substantially in a chord-wise direction relative to an airflow over the aerodynamic body. The method then suctions at least one portion of the airflow through an outer surface of the perforated panel skin, and draws the at least one portion of the airflow through the at least one hollow member.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

FIG. 3 is an illustration of a vertical fin cross section without a laminar flow corrugation-stiffened bonded structure for providing Hybrid Laminar Flow Control.

FIG. 4 is an illustration of a vertical fin cross section comprising a laminar flow corrugation-stiffened bonded structure providing Hybrid Laminar Flow Control according to an embodiment of the disclosure.

DETAILED DESCRIPTION

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding field, background, summary or the following detailed description. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to aerodynamics, structures, manufacturing, and other functional aspects of the systems (and the individual operating components of the systems) may not be described in detail herein. In addition, those skilled in the art will appreciate that embodiments of the present disclosure may be practiced in conjunction with a variety of structural bodies, and that the embodiments described herein are merely example embodiments of the disclosure.

Embodiments of the disclosure are described herein in the context of practical non-limiting applications, namely, an airfoil leading edge. Embodiments of the disclosure, however, are not limited to such airfoil leading edge applications, and the techniques described herein may also be utilized in other aerodynamic surface applications. For example, embodiments may be applicable to tail structures, engine struts, wind turbine blades, hydrodynamic surfaces utilizing liquid (e.g., water) instead of air, and the like.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

Figure 1:
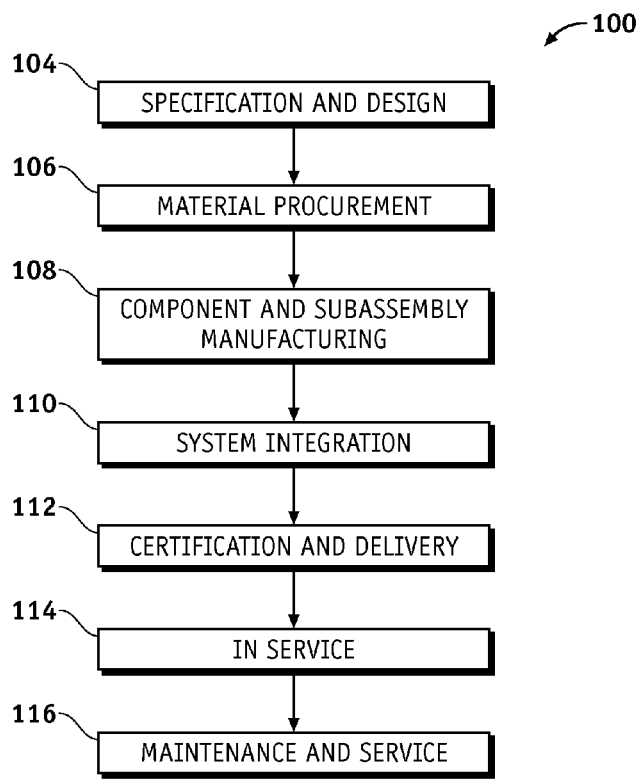
FIG. 1 is an illustration of a flow diagram of an exemplary aircraft production and service methodology.
Figure 2:
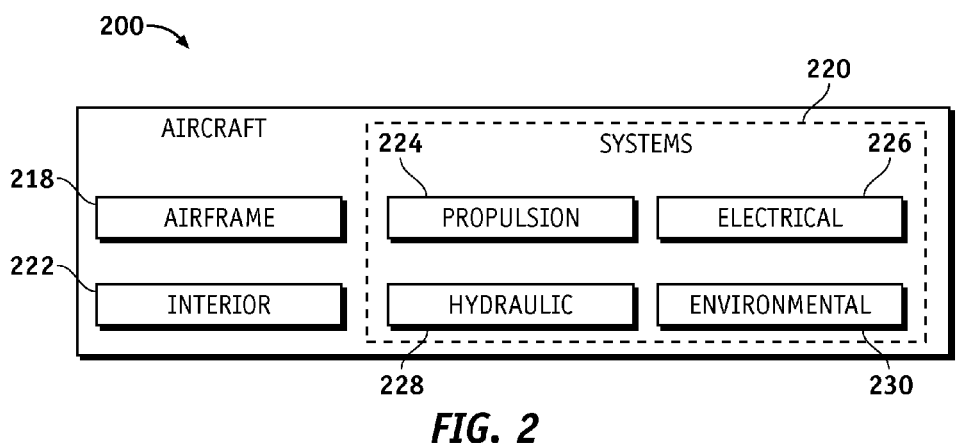
FIG. 2 is an illustration of an exemplary block diagram of an aircraft.

Referring more particularly to the drawings, embodiments of the disclosure may be described in the context of an aircraft manufacturing and service method 100 as shown in FIG. 1 and an aircraft 200 as shown in FIG. 2. During pre-production, the exemplary method 100 may include specification and design 104 of the aircraft 200 and material procurement 106. During production, component and subassembly manufacturing 108 and system integration 110 of the aircraft 200 takes place. Thereafter, the aircraft 200 may go through certification and delivery 112 in order to be placed in service 114. While in service by a customer, the aircraft 200 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be without limitation an airline, leasing company, military entity, service organization, and the like.

As shown in FIG. 2, the aircraft 200 produced by the exemplary method 100 may include an airframe 218 with a plurality of systems 220 and an interior 222. Examples of high-level systems 220 include one or more of a propulsion system 224, an electrical system 226, a hydraulic system 228, and an environmental system 230. Any number of other systems may also be included. Although an aerospace example is shown, the embodiments of the disclosure may be applied to other industries.

Apparatus and methods embodied herein may be employed during any one or more of the stages of the production and service method 100. For example, components or subassemblies corresponding to production process 108 may be fabricated or manufactured in a manner similar to components or subassemblies produced while the aircraft 200 is in service. In addition, one or more apparatus embodiments, method embodiments, or a combination thereof may be utilized during the production stages 108 and 110, for example, by substantially expediting assembly of or reducing the cost of an aircraft 200. Similarly, one or more of apparatus embodiments, method embodiments, or a combination thereof may be utilized while the aircraft 200 is in service, for example and without limitation, to maintenance and service 116.

Embodiments of the disclosure provide for enabling and maintaining laminar flow over airplane external surfaces utilizing a Hybrid Laminar Flow Control, thereby reducing skin friction drag. Hybrid Laminar Flow Control may refer to a strategic application of suction through small holes in a leading-edge region of a surface such as a wing to remove instabilities that may cause airflow near a surface to transition from a laminar to a turbulent state.

FIG. 3 is an illustration of a vertical fin cross section 300 without Hybrid Laminar Flow Control showing turbulent flow 304 near a surface 302. As shown in FIG. 3, the turbulent flow 304 near the surface 302 is fully turbulent, thereby creating a high skin friction drag.

FIG. 4 is an illustration of a vertical fin cross section 400 (airfoil 400) comprising a laminar flow corrugation-stiffened bonded structure 402 (corrugation-stiffened structure 402) providing Hybrid Laminar Flow Control according to an embodiment of the disclosure. A suction area 404 of the corrugation-stiffened structure 402 creates a laminar flow 406 near an airfoil surface 408. The suction area 404 is perforated to allow air to flow through the airfoil surface 408, and stiffened to maintain shape while allowing the airflow to occur. Embodiments of the corrugation-stiffened structure 402 are described below in the context of FIGS. 8-20.

Figure 5:
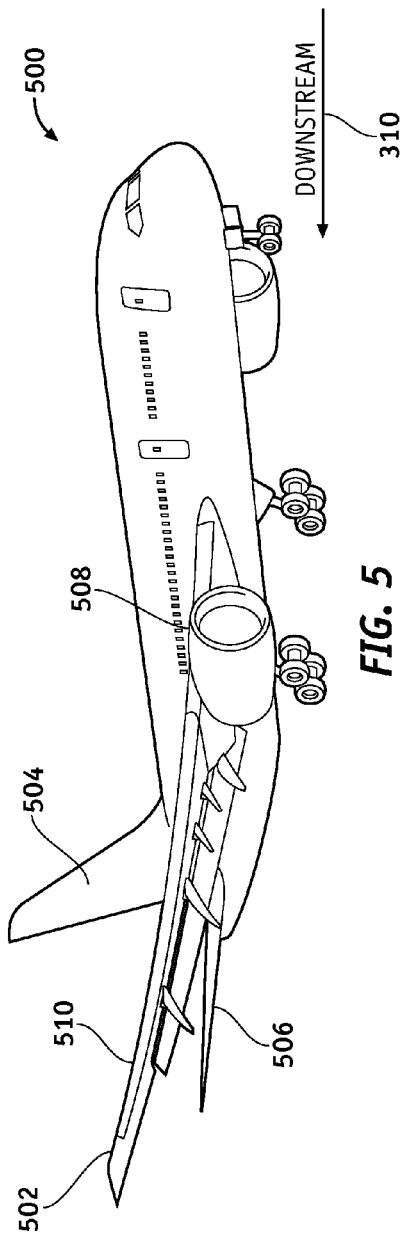
FIG. 5 is an illustration of an aircraft showing various external structures that can be subject to laminar flow.
Figure 7:
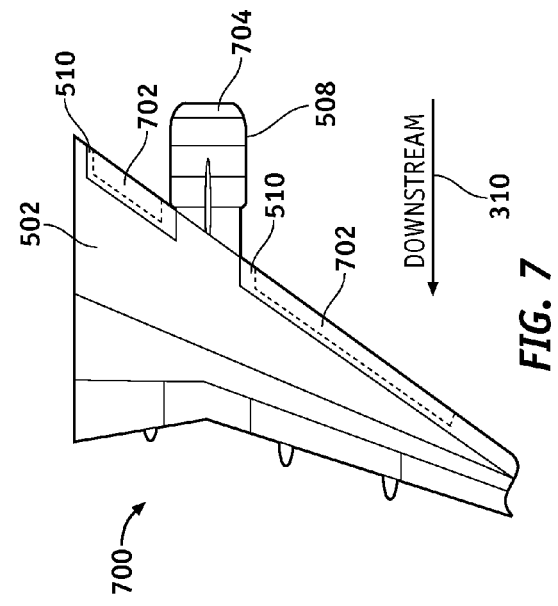
FIG. 7 is an illustration of a wing of the aircraft shown in FIG. 5 showing approximate regions of laminar flow on leading edge control surfaces and on an engine nacelle.
Figure 6:
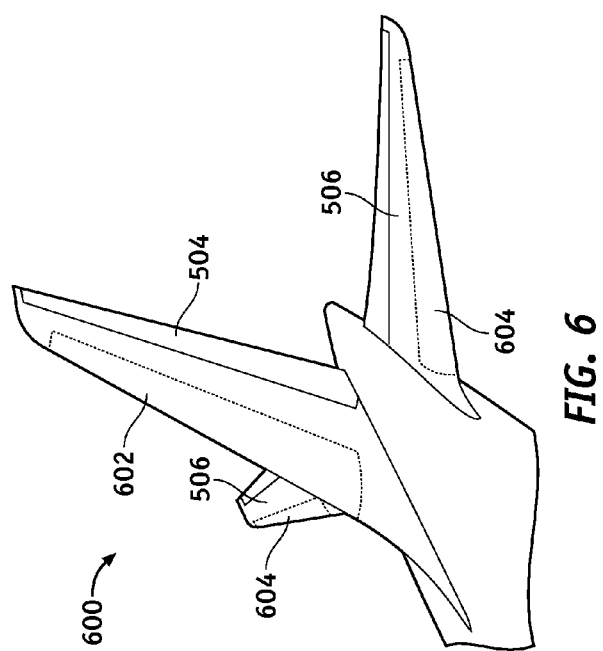
FIG. 6 is an illustration of a tail section of the aircraft shown in FIG. 5 showing approximate regions of laminar flow on a vertical fin and horizontal stabilizers.

Embodiments of the disclosure provide a panel structure that enables laminar flow over at least a portion of external surfaces such as the external surfaces of an aircraft 500 (FIG. 5) and maintains a laminar boundary layer on exterior aerodynamic surfaces as shown in FIGS. 5-7.

FIG. 5 is an illustration of the aircraft 500 showing various external structures, such as but without limitation, the vertical fin 504, a horizontal stabilizer 506, an engine nacelle 508, leading edge control surfaces 510 (i.e., flap and spoilers), and the like, that can be subject to laminar flow.

FIG. 6 is an illustration of a tail section 600 of the aircraft 500 showing approximate regions of laminar flow 602 and 604 on the vertical fin 504 and the horizontal stabilizers 506 respectively.

FIG. 7 is an illustration of a wing 502 of the aircraft 500 showing approximate regions of laminar flow 702 and 704 on the leading edge control surfaces 510 and on the engine nacelle 508 respectively.

Figure 8:
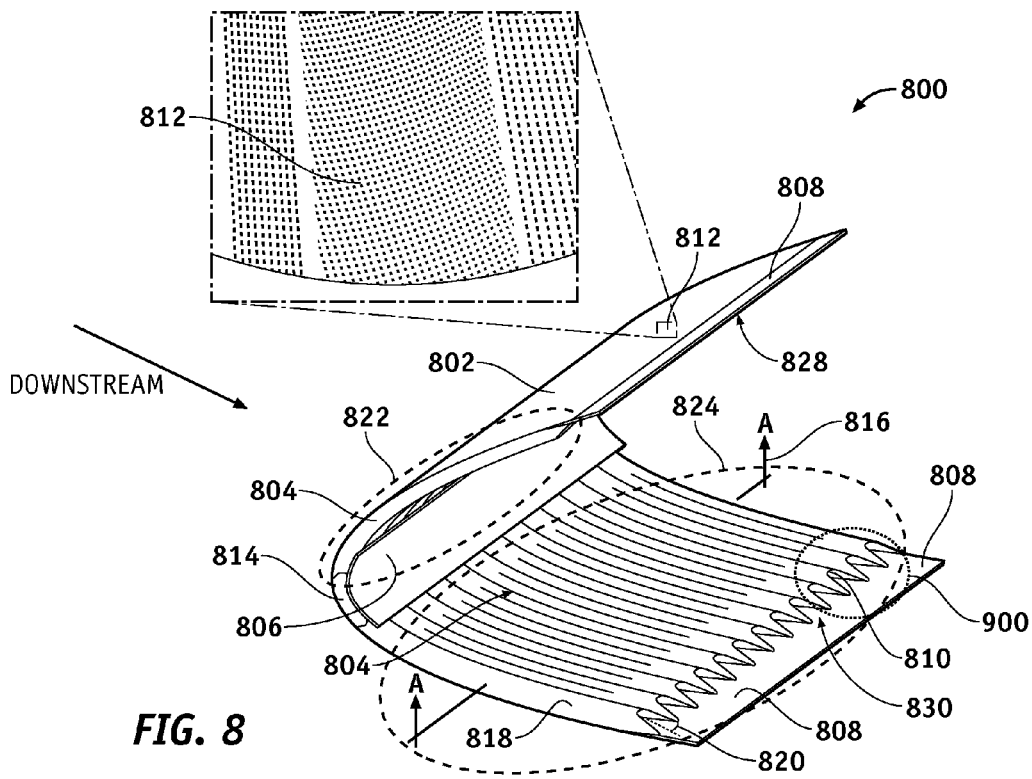
FIG. 8 is an illustration of a perspective view of an exemplary laminar flow corrugation-stiffened bonded structure according to an embodiment of the disclosure.

FIG. 8 is an illustration of a perspective view of an exemplary laminar flow corrugation-stiffened bonded structure 800 (corrugation-stiffened structure 800) according to an embodiment of the disclosure. The corrugation-stiffened structure 800 may be an aerodynamic body comprising, for example but without limitation, a flat panel, a curved leading edge, and the like. The corrugation-stiffened structure 800 comprises a perforated panel skin 802, one or more corrugated stiffeners 804, a strap 806, an edgeband 808, and one or more ends 810 of the corrugated stiffeners 804.

The perforated panel skin 802 allows for passively suctioning air 902 (FIG. 9) from an outer surface 908 (FIG. 9) to an inner surface 910 (FIG. 9) of the corrugation-stiffened structure 800 via a plurality of perforations/holes 812 to facilitate laminar flow over external aerodynamic surfaces such as, but without limitation, the vertical fin 504, the horizontal stabilizer 506, the engine nacelle 508, the leading edge control surfaces 510, and the like (FIGS. 5-7). The perforated panel skin 802 may be made of, for example but without limitation, carbon fiber-reinforced polymer (CFRP)/CP2 titanium, and the like. A thickness 1508 (FIG. 15) of the perforated panel skin 802 may be, for example but without limitation, about 0.04 inches to about 0.063 inches, and the like.

The perforations/holes 812 are, for example but without limitation, suitably spaced, shaped, drilled (e.g., laser-drilled), and the like to allow an appropriate amount of passive-suction of air from the outside surface 908 to the inner surface 910 while maintaining laminar flow surfaces sufficiently smooth. In this manner, the perforated panel skin 802 is suitably perforated to allow air to flow therethrough, and is stiffened, as explained in more detail below, to maintain its shape while allowing the airflow to occur. A number of the perforations/holes 812 used may depend on, for example but without limitation, flight speed, local Mach number, structural integrity, aerodynamic requirements, and the like. For example but without limitation, in a subsonic flight, a suitable number of the perforations/holes 812 can be provided to drop a surface pressure of the external aerodynamic surfaces by about one psi for passively moving the air 902 from the outer/external surface 908 to the inner surface 910. In this manner, laminar flow over the external aerodynamic surfaces is facilitated.

The corrugated stiffeners 804 are formed to stiffen the panel/corrugation-stiffened structure 800. The corrugated stiffeners 804 comprise corrugated or wave-shaped composite stiffeners which are bonded (FIG. 15) to the inner surface 910 (FIG. 9) of the corrugation-stiffened structure 800. For example, adhesively bonding the corrugated stiffeners 804 to the inner surface 910 precludes a need for traditional fasteners. Fasteners may disrupt the airflow over the external aerodynamic surfaces, reducing or negating laminar flow benefits. In the embodiment shown in FIG. 8, the corrugated stiffeners 804 are located on an upper inner surface 828 and a lower inner surface 830 of the inner surface 910 of the corrugation-stiffened structure 800. In the embodiment shown in FIG. 8, one or more hollow members 818 coupled to each of the upper inner surface 828 and the lower inner surface 830 stiffen the leading edge 308/814. In the embodiment shown in FIG. 8, the corrugated stiffeners 804 are formed in two pieces. An upper piece 822 and a lower piece 824 are detached from the leading edge 308/814 to facilitate manufacturing of the corrugated stiffeners 804. In this manner, the upper piece 822 and the lower piece 824 of the corrugated stiffeners 804 are not extended through the leading edge 308/814, and are coupled to each other by the strap 806 as explained below.

However, in another embodiment, the corrugated stiffeners 804 are extended to the leading edge 308/814 (1902 FIG. 19), thereby the strap 806 is not used. In this manner, a suitable composite material is utilized, as explained below, to allow fabrication of the corrugated stiffeners 804 around the leading edge 308/814 as one continuous piece.

In one embodiment, the corrugated stiffeners 804 are oriented in a substantially chord-wise direction 306 (FIG. 3) of the leading edge 308/814, relative to a downstream airflow 310 over the airfoil 400, and substantially perpendicular to the leading edge 308/814. Chord-wise orientation of the corrugated stiffeners 804 is more efficient structurally, spanning between a stiff nose of the leading edge 308/814 and an auxiliary spar (not shown). However, various shapes may be used for the corrugated stiffeners 804 depending on, for example but without limitation, various pressure zones on the external aerodynamic surfaces (FIGS. 5-7). The corrugated stiffeners 804 may be, for example but without limitation, hexagonal, V-shape, and the like. In order to meet aerodynamic porosity requirements while still maintaining structural integrity at substantially all loads and environmental conditions, bonded joints 1502 (FIG. 15) can be configured to block a substantially minimum number of the perforations/holes 812 on the perforated panel skin 802. In this manner, airflow passes through the perforated panel skin 802 and around the corrugated stiffeners 804 to a low-pressure passive aft-facing vent as explained below in more detail in the context of discussion of FIG. 9.

The corrugated stiffeners 804 may be made from, for example but without limitation, CP-2 titanium, one ply of 0/+−60 BMS9-223 braided carbon fiber-reinforced polymer, or the like. An orientation of a braid may be such that about 50% of the carbon fibers are in the substantially chord-wise direction 306 for structural efficiency. This may also be easier to fabricate, as 60-degree fibers may bend around sharp corners better than 90-degree fibers. The corrugated stiffeners 804 can provide the leading edge 308/814 with adequate bending stiffness, smoothness, and waviness to meet operational requirements. In addition, the corrugated stiffeners 804 enable good bonding to the perforated panel skin 802. The good bonding can mitigate current methods where parts may be held substantially rigid during assembly by vacuum-chuck bond assembly tools and bonding between two rigid bodies may be non-optimized due to achievable part tolerances. The corrugated stiffeners 804 and corrugation-stiffened structure 800 are as lightweight as possible in order to meet overall airplane efficiency demands.

As mentioned above, in one embodiment, the corrugated stiffeners 804 are formed in one-piece (1902 in FIG. 19) continuously on the inner surface 910 providing full stiffeners extended to and around the leading edge 308/814. In this manner, the corrugated stiffeners 804 are substantially lightweight and may utilize a formable structure such as, for example but without limitation, a carbon fiber-reinforced polymer utilizing "broken carbon fiber", Stretch-Broken Carbon Fiber, and the like. However, as mentioned above, the corrugated stiffeners 804 may be alternatively formed from two or more pieces. Thus, a carbon fiber-reinforced polymer braid that may not be formed into a tight "nose" radius may be formed in two or more pieces as explained above. An exemplary geometric shape of the corrugated stiffeners 804 is shown in more detail in FIG. 11 below.

Figure 16:
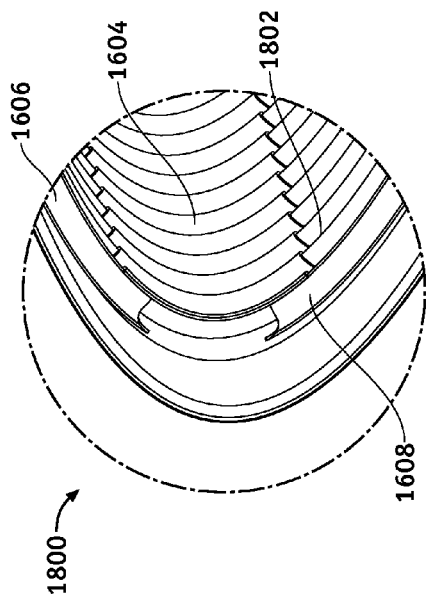
FIG. 16 is an illustration of a perspective view of a portion of an exemplary laminar flow corrugation-stiffened bonded showing a corrugated leading edge strap according to an embodiment of the disclosure.

The strap 806 couples the upper piece 822 and the lower piece 824 of the corrugated stiffeners 804 to each other. The strap 806 conforms to the corrugated stiffeners 804 at ridges 1102 (FIG. 11) but still allows airflow. In the embodiment shown in FIG. 8, the strap 806 does not touch the perforated panel skin 802. The strap 806 may be made from, for example but without limitation, CP1 titanium, and the like, having a thickness of, for example but without limitation, about 0.03 inches to about 0.06 inches, and the like. The strap 806 is bonded in an area near the leading edge 814 to provide stiffness and strength to the corrugation-stiffened structure 800. The strap 806 may comprise, for example but without limitation, a smooth surface as shown in FIG. 8, a corrugated surface such as a corrugated leading edge strap 1604 as shown in FIG. 16, and the like. The corrugated leading edge strap 1604 provides continuity between the upper piece 822 and the lower piece 824 of the corrugated stiffeners 804 so that the upper piece 822 and the lower piece 824 communicate air.

The edgeband 808 is coupled to the perforated panel skin 802 and the corrugated stiffeners 804. The edgeband 808 couples the corrugation-stiffened structure 800 to a substructure (not shown) and acts as a plenum chamber to receive air from the corrugated stiffeners 804. The edgeband 808 may be made from, for example but without limitation, fiberglass, aramid fiber, carbon fiber, aluminum, and the like.

The ends 810 (outlets 810) of the corrugated stiffeners 804 allow air to exit therethrough. The ends 810 provide an outlet for the hollow members 818 to flow air 902 (FIG. 9) to the edgeband 808/plenum chamber. The ends 810 may be shaped, for example but without limitation, triangular, circular, rectangular, and the like. Angles 820 of the ends 810 are provided such that stress concentration at the ends 810 is prevented.

Current honeycomb sandwich leading edge architectures may not be amenable to incorporation of the hybrid laminar flow. Current honeycomb sandwich panels also: 1) tend to absorb and retain moisture; 2) may be non-optimal for inspection; and 3) may be less optimal for repair than the corrugation-stiffened structure 800.

Figure 9:
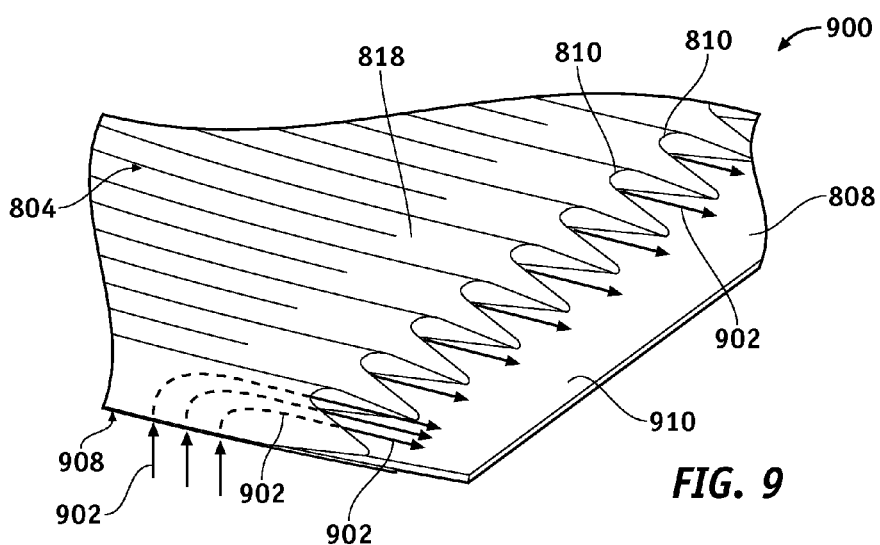
FIG. 9 is an illustration of an enlarged view of a section of the exemplary laminar flow corrugation-stiffened bonded structure shown in FIG. 8 showing airflow according to an embodiment of the disclosure.

FIG. 9 is an illustration of an enlarged view of a section 900 of the corrugation-stiffened structure 800 showing an airflow according to an embodiment of the disclosure. The air 902 flows through the perforated panel skin 802, continues to flow along the hollow members 818 of the corrugated stiffeners 804, and exits from the ends 810 (outlets 810) of the corrugated stiffeners 804. In this manner, the corrugation-stiffened structure 800 provides for a low-pressure passive aft-facing vent to allow a sufficient amount of air suction for maintaining a laminar boundary layer on the perforated panel skin 802, while providing a stiff skin such as the perforated panel skin 802.

FIGS. 10-13 illustrate exemplary geometric shapes of the corrugation-stiffened structure 800. FIGS. 10-13 may have functions, material, and structures that are similar to the embodiments shown in FIGS. 1-12. Therefore, common features, functions, and elements may not be redundantly described here.

Figure 10:
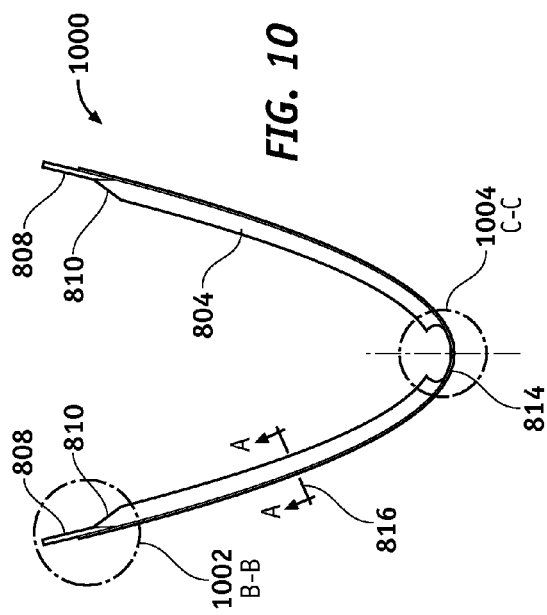
FIG. 10 is an illustration of a cross section of an exemplary laminar flow corrugation-stiffened bonded structure according to an embodiment of the disclosure.

FIG. 10 is an illustration of a cross section 1000 of the exemplary corrugation-stiffened structure 800 showing the corrugated stiffeners 804, the edgeband 808, and the ends 810 according to an embodiment of the disclosure.

Figure 11:
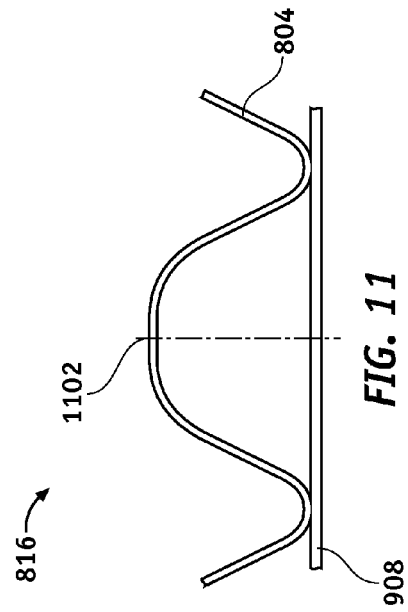
FIG. 11 is an illustration of a section A-A of the exemplary laminar flow corrugation-stiffened bonded structure shown in FIG. 10 according to an embodiment of the disclosure.

FIG. 11 is an illustration of a section A-A 816 of the corrugated stiffeners 804 of the corrugation-stiffened structure 800 shown in FIG. 10 showing a wave-like shape comprising ridges 1102 of the corrugated stiffeners 804 according to an embodiment of the disclosure.

Figure 12:
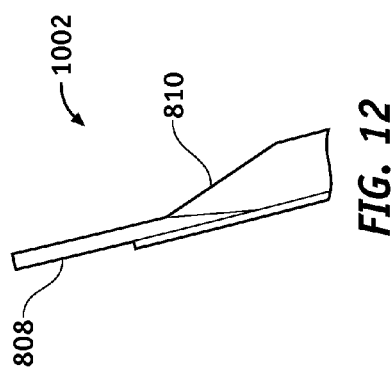
FIG. 12 is an illustration of a section B-B of the exemplary laminar flow corrugation-stiffened bonded structure shown in FIG. 10 according to an embodiment of the disclosure.

FIG. 12 is an illustration of an enlarged view of a section B-B 1002 of the exemplary corrugation-stiffened structure 800 shown in FIG. 10 showing the edgeband 808 and the ends 810, according to an embodiment of the disclosure.

Figure 13:
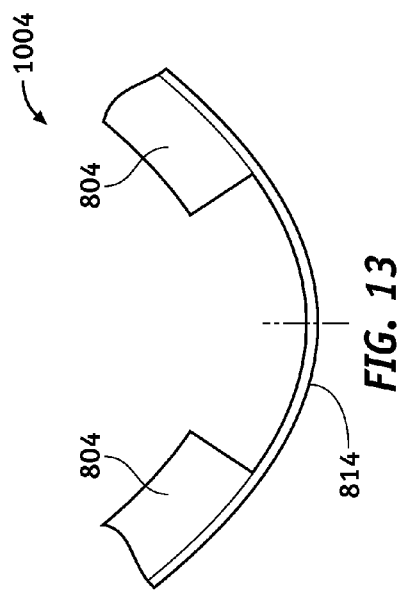
FIG. 13 is an illustration of a section C-C of the exemplary laminar flow corrugation-stiffened bonded structure shown in FIG. 10 according to an embodiment of the disclosure.

FIG. 13 is an illustration of an enlarged view of a section C-C 1004 of the exemplary corrugation-stiffened structure 800 shown in FIG. 10 showing the corrugated stiffeners 804 and the leading edge 814 according to an embodiment of the disclosure.

Figure 14:
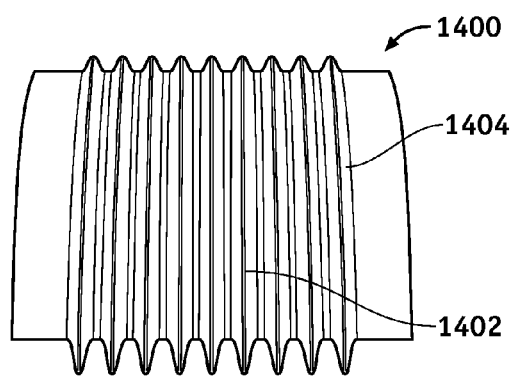
FIG. 14 is an illustration of a top view of an exemplary stiffener of a laminar flow corrugation-stiffened bonded structure showing adhesive placed on each rib stiffener according to an embodiment of the disclosure.

FIG. 14 is an illustration of a top view 1400 of an exemplary rib stiffener 1404 of the corrugation-stiffened structure 800 showing an adhesive 1402 placed on the rib stiffener 1404 according to an embodiment of the disclosure. In this manner, each of the rib stiffener 1404 receives the adhesive 1402 at each of the bonded joints 1502 (stiffener node) shown in FIG. 15.

Figure 15:
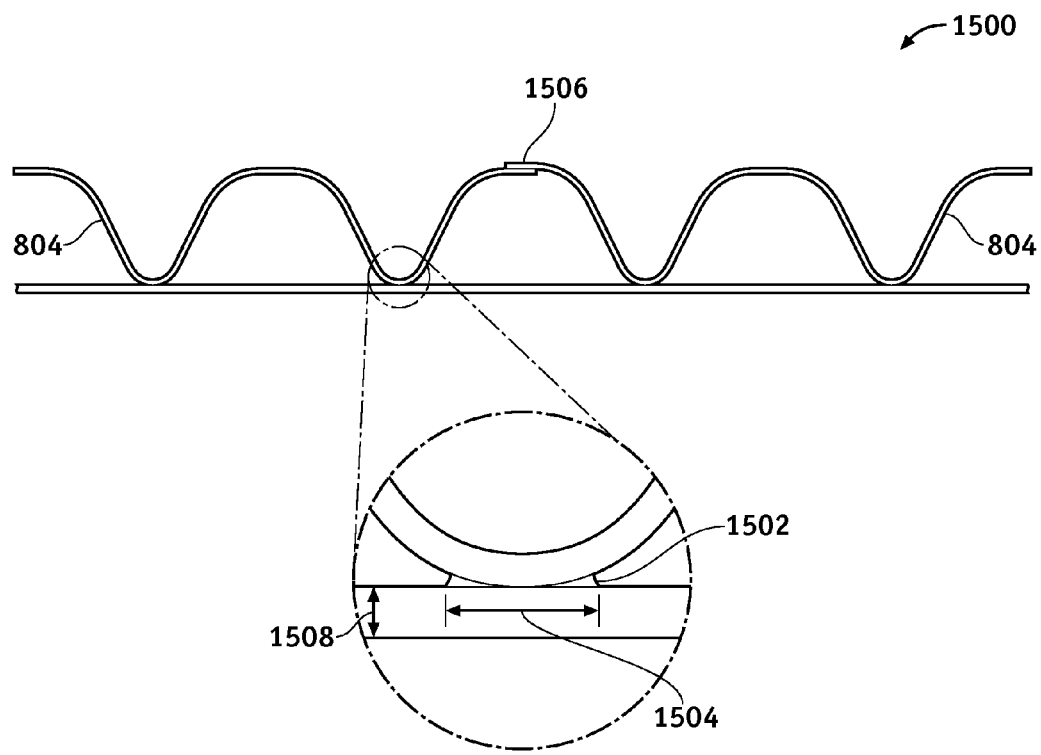
FIG. 15 is an illustration of a cross sectional view of an exemplary stiffener of a laminar flow corrugation-stiffened bonded structure showing a stiffener/stiffener bond and a stiffener/titanium bond according to an embodiment of the disclosure.

FIG. 15 is an illustration of a cross sectional view of an exemplary stiffener of the corrugation-stiffened structure 800 showing a stiffener/stiffener bond 1506 and a stiffener/titanium bond at the bonded joint 1502 according to an embodiment of the disclosure. As mentioned above, the bonded joints 1502 block a substantially minimum number of the perforations/holes 812 of the perforated panel skin 802, while allowing airflow therethrough and around the corrugated stiffeners 804 to a low-pressure passive aft-facing vent as explained above in more detail in the context of discussion of FIG. 9. Accurate control of bond-line width 1504 enables substantially precise control of the perforations/holes 812 blocked by the adhesive 1402. In this manner, embodiments of the disclosure provide a stiffening of the perforated panel skin 802 while maintaining a substantially precise air transfer necessary for providing laminar flow. The corrugated stiffeners 804 are bonded to the perforated panel skin 802 with, for example but without limitation, a 250F-cure film adhesive in an oven. Alternatively, the corrugated stiffeners 804 may be bonded to the perforated panel skin 802 by methods, such as but without limitation, thermal or ultra-sonic joining (i.e., for thermoplastic stiffeners), and the like. The bonded joint 1502 can be inspected by an inspection method, such as but without limitation, ultrasonic, optical, thermographic non-destructive inspection, and the like. The bond-line width 1504 of the bonded joint 1502 may be, for example but without limitation, about 0.14 to about 0.16 inches, and the like.

FIGS. 16-19 may have functions, material, and structures that are similar to the embodiments shown in FIGS. 1-15. Therefore common features, functions, and elements may not be redundantly described here.

FIG. 16 is an illustration of a perspective view of an exemplary corrugation-stiffened structure 1600 showing the corrugated leading edge strap 1604 according to an embodiment of the disclosure. The corrugation-stiffened structure 1600 comprises a leading edge tip 1602, the corrugated leading edge strap 1604, one or more upper corrugated stiffeners 1606 coupled to the inner surface 1612, one or more lower corrugated stiffeners 1608 coupled to the inner surface 1612, and one or more ends 1610.

As shown in FIG. 16, the corrugated leading edge strap 1604 couples the upper and lower corrugated stiffeners 1606/1608 (similar to the upper piece 822 and the lower piece 824 of corrugated stiffeners 804 in FIG. 8) to each other. In the embodiment shown in FIG. 16, the corrugated leading edge strap 1604 is configured to be detached from an area of the inner surface 1612 of the corrugation-stiffened structure 1600 near the leading edge tip 1602.

Figure 17:
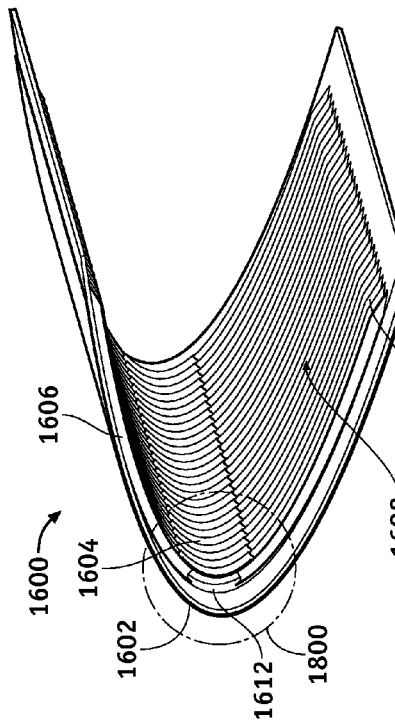
FIG. 17 is an illustration of an enlarged view of a portion of the exemplary laminar flow corrugation-stiffened bonded structure shown in FIG. 16 according to an embodiment of the disclosure.

FIG. 17 is an illustration of an enlarged view 1700 of a portion of the exemplary corrugation-stiffened structure 1600 showing the upper and lower corrugated stiffeners 1606/1608 coupled to each other by a corrugated leading edge strap 1604 bonded at front ends 1702 of the upper and lower corrugated stiffeners 1606/1608 according to an embodiment of the disclosure.

Figure 18:
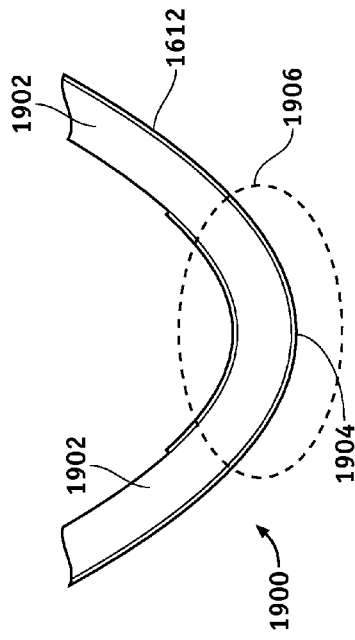
FIG. 18 is an illustration of an enlarged view of a portion of the exemplary laminar flow corrugation-stiffened bonded structure shown in FIG. 16 according to an embodiment of the disclosure.

FIG. 18 is an illustration of an enlarged view of a portion 1800 of the exemplary corrugation-stiffened structure 1600 according to an embodiment of the disclosure. As shown in FIG. 18 the corrugated leading edge strap 1604 conforms to ridges 1802 of the upper and lower corrugated stiffeners 1606/1608 but still allows air flow 906 (FIG. 9).

Figure 19:
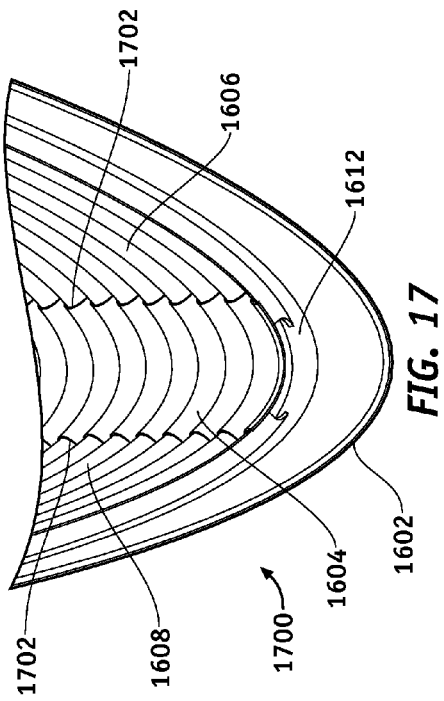
FIG. 19 is an illustration of a cross section of a portion of an exemplary laminar flow corrugation-stiffened bonded structure according to an embodiment of the disclosure.

FIG. 19 is an illustration of an enlarged view of a portion of an exemplary one-piece corrugation-stiffened structure 1900 showing the corrugated stiffeners 1902 bonded to the inner surface 1612 at a bonding area 1904 at the leading edge 1906 according to an embodiment of the disclosure. The corrugated stiffeners 1902 are one-piece and continuous around the leading edge 1906 (1602 in FIG. 16). Since the corrugated stiffeners 1902 are one-piece and continuous around the leading edge 308/814, a strap such as the corrugated leading edge strap 1604 is not used. In this manner, the perforations/holes 812 (FIG. 8) may be cut/drilled into the corrugated stiffeners 1902 around the leading edge 1906 (e.g., if the openings of the ends 810/1610 are not sufficient).

Figure 20:
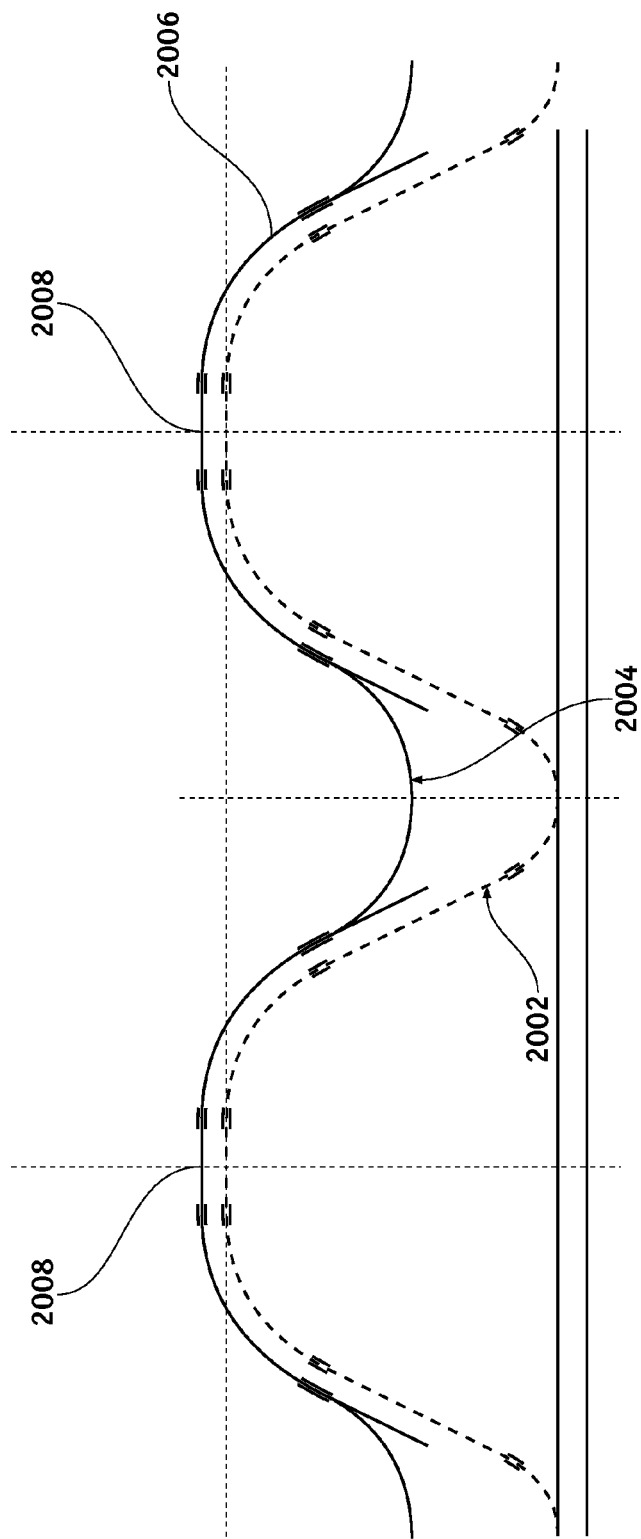
FIG. 20 is an illustration of a cross section of stiffeners and a strap of an exemplary laminar flow corrugation-stiffened bonded structure according to an embodiment of the disclosure.

FIG. 20 is an illustration of a cross section 2000 of corrugated stiffeners 2002 and a corrugated strap 2004 of an exemplary corrugation-stiffened structure 1600 according to an embodiment of the disclosure. As shown in FIG. 20, the corrugated strap 2004 couples the corrugated stiffeners 2002 to each other. The corrugated strap 2004 conforms to the inner surface 1612 (FIG. 16) and comprises ridges 2008 located, for example but without limitation, about 1.0 inch to about 1.2 inches apart.

Figure 21:
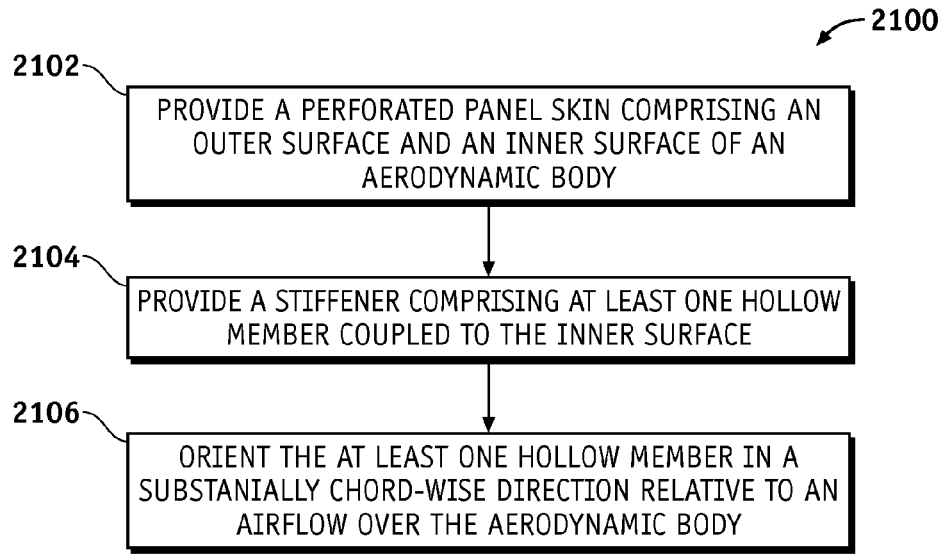
FIG. 21 is an illustration of an exemplary flow chart showing a process for providing a laminar flow corrugation-stiffened bonded structure according to an embodiment of the disclosure.

FIG. 21 is an illustration of an exemplary flow chart showing a process 2100 for providing a corrugation-stiffened structure 800/1600 for providing a laminar flow on a leading edge of an airfoil according to an embodiment of the disclosure. The various tasks performed in connection with process 2100 may be performed mechanically, by software, hardware, firmware, or any combination thereof. For illustrative purposes, the following description of process 2100 may refer to elements mentioned above in connection with FIGS. 1-20. In practical embodiments, portions of the process 2100 may be performed by different elements of the corrugation-stiffened structure 800 such as the perforated panel skin 802, the corrugated stiffeners 804, the strap 806, the edgeband 808, and the ends 810 of the corrugated stiffeners 804. Processes 2100 may have functions, material, and structures that are similar to the embodiments shown in FIGS. 1-20. Therefore common features, functions, and elements may not be redundantly described here.

Process 2100 may begin by providing a perforated panel skin such as the perforated panel skin 802 comprising the outer surface 908 and the inner surface 910 of an aerodynamic body such as the airfoil 400 (task 2102).

Process 2100 may then continue by providing the corrugated stiffener 804 comprising the at least one hollow member 818 coupled to the inner surface 910 (task 2104).

Process 2100 may then continue by orienting the at least one hollow member 818 in the substantially chord-wise direction 306 relative to the downstream airflow 310 over the aerodynamic body (task 2106).

Figure 22:
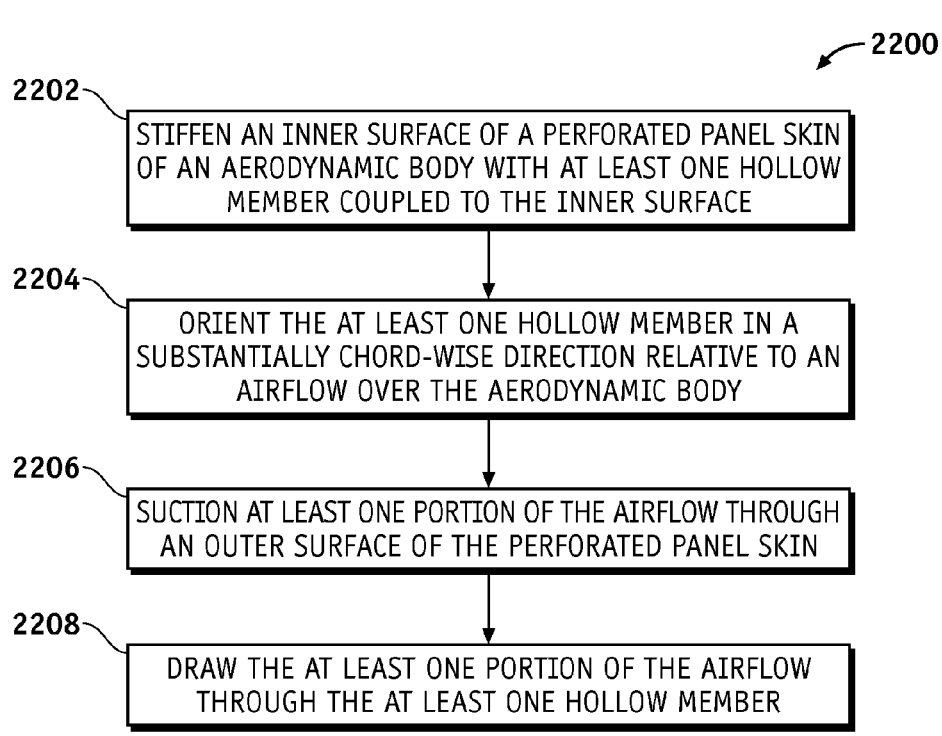
FIG. 22 is an illustration of an exemplary flow chart showing a process for providing a laminar flow on an aerodynamic body according to an embodiment of the disclosure.

FIG. 22 is an illustration of an exemplary flow chart showing a process 2200 for providing a corrugation-stiffened structure 800/1600 and for providing a laminar flow on a leading edge of an airfoil according to an embodiment of the disclosure. The various tasks performed in connection with process 2200 may be performed mechanically, by software, hardware, firmware, or any combination thereof. For illustrative purposes, the following description of process 2200 may refer to elements mentioned above in connection with FIGS. 1-20. In practical embodiments, portions of the process 2200 may be performed by different elements of the corrugation-stiffened structure 800/1600 such as the perforated panel skin 802, the corrugated stiffeners 804, the strap 806, the edgeband 808, and the ends 810 of the corrugated stiffeners 804. Process 2200 may have functions, material, and structures that are similar to the embodiments shown in FIGS. 1-20. Therefore common features, functions, and elements may not be redundantly described here.

Process 2200 may begin by stiffening the inner surface 910 of the perforated panel skin 802 of the corrugation-stiffened structure 800 (aerodynamic body) with the at least one hollow member 818 coupled to the inner surface 910 (task 2202).

Process 2200 may then continue by orienting the at least one hollow member 818 in the substantially chord-wise direction 306 relative to an airflow such as the downstream airflow 310 over the aerodynamic body (task 2204).

Process 2200 may then continue by suctioning at least one portion of the downstream airflow 310 through the outer surface 908 of the perforated panel skin 802 of the aerodynamic body (task 2206).

Process 2200 may then continue by drawing the at least one portion of the downstream airflow 310 through the at least one hollow member 818 (task 2208).

In this way, various embodiments of the disclosure provide a method for stiffening of a skin of an aerodynamic body while maintaining a substantially precise air transfer necessary to maintain laminar boundary layer over the aerodynamic body. The embodiments allow airflow through a leading edge structure, which allows for laminar flow on the surface thereof, while still maintaining the required aerodynamic shape also necessary for the laminar flow. Maintaining the laminar flow, results in a large aerodynamic drag reduction as compared to tradition turbulent flow found on most commercial aircraft in service today. In addition, corrugation-stiffened structure 800, allows easy inspection of surfaces, may not substantially entrap moisture, is repairable via a bonded corrugated doubler easy to inspect and can be made in a variety of materials and material combination and could be used to replace honeycomb sandwich in many non-laminar-flow applications.

While at least one example embodiment has been presented in the foregoing detailed description, it should be appreciated that a vast number of variations exist. It should also be appreciated that the example embodiment or embodiments described herein are not intended to limit the scope, applicability, or configuration of the subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 8-20 depict example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The invention claimed is:

1. An aerodynamic body, comprising:
    a perforated panel skin of the aerodynamic body, the perforated panel skin comprising an inner surface and an outer surface; and
    at least one hollow member coupled to the inner surface and operable to stiffen the perforated panel skin and passively suction air from the outer surface and through the perforated panel skin to provide suctioned air and direct the suctioned air to a passive aft-facing vent directly vented to an interior of the aerodynamic body, the at least one hollow member comprising a corrugated wave shape with ridges thereof detached from the perforated panel skin and the passive aft-facing vent at one end and oriented in a substantially chord-wise direction relative to an airflow over the aerodynamic body, the passive aft-facing vent directly vented to the interior of the aerodynamic body outside the at least one hollow member.

2. The aerodynamic body according to claim 1, wherein the at least one hollow member is bonded to the perforated panel skin via a bond-line coupled to the inner surface.

3. The aerodynamic body according to claim 1, wherein the passive aft-facing vent is coupled to a plenum chamber, and configured to vent directly to the plenum chamber.

4. The aerodynamic body according to claim 1, wherein the at least one hollow member stiffens the aerodynamic body.

5. The aerodynamic body according to claim 1, wherein the aerodynamic body comprises a leading edge of an airfoil.

6. The aerodynamic body according to claim 5, wherein the at least one hollow member is formed continuously along the inner surface thereby providing stiffeners extended continuously to and around the leading edge.

7. The aerodynamic body according to claim 5, wherein the at least one hollow member comprises a first piece bonded to a first inner surface of the perforated panel skin and a second piece bonded to a second inner surface of the perforated panel skin.

8. The aerodynamic body according to claim 7, wherein the first piece and the second piece are each oriented in a substantially chord-wise direction relative to the airflow.

9. The aerodynamic body according to claim 8, wherein the first piece and the second piece are coupled to each other via a leading edge strap, wherein the leading edge strap is: detached from an area of the inner surface near a leading edge tip thereby providing no attachment to the perforated panel skin of the aerodynamic body, conforms to the at least one hollow member at the ridges thereof, and extends along a leading edge span.

10. The aerodynamic body according to claim 9, wherein the leading edge strap provides continuity between the first piece and the second piece of the at least one hollow member allowing the first piece and the second piece to communicate air.

11. The aerodynamic body according to claim 7, wherein the first piece and the second piece are each operable to:
    suction air through the perforated panel skin; and
    flow air therethrough and out of respective ends of the first piece and the second piece.

12. A method for providing laminar flow over an aerodynamic body, the method comprising:
    stiffening an inner surface of a perforated panel skin of the aerodynamic body with at least one hollow member coupled to the inner surface, the at least one hollow member comprising a corrugated wave shape with ridges thereof detached from the perforated panel skin and a passive aft-facing vent at one end, the inner surface comprising an upper inner surface and a lower inner surface;
    orienting the at least one hollow member in a substantially chord-wise direction relative to an airflow over the aerodynamic body;
    passively suctioning the airflow entering the perforated panel skin through an outer surface of the perforated panel skin to the passive aft-facing vent directly vented to an interior of the aerodynamic body, the interior of the aerodynamic body surrounded and shared by the upper inner surface and the lower inner surface of the aerodynamic body, and the airflow exits from the one end directly to the interior of the aerodynamic body; and drawing the airflow through the at least one hollow member and out of the passive aft-facing vent.

13. The method according to claim 12, further comprising bonding the at least one hollow member to the inner surface.

14. The method according to claim 12, further comprising flowing air through the passive aft-facing vent of the at least one hollow member to a plenum chamber.

15. The method according to claim 12, further comprising forming the at least one hollow member continuously along the inner surface such that the at least one hollow member is extended around a leading edge of the aerodynamic body.

16. A method for forming a corrugation-stiffened structure for a leading edge of an aerodynamic body:
   orienting a first piece of at least one hollow member in a substantially chord-wise direction relative to an airflow over the leading edge, the first piece comprising a corrugated wave shape;
   bonding the first piece at nodes of the first piece to a first inner surface of a perforated panel skin with ridges of the first piece detached from the perforated panel;
   stiffening the first inner surface with the first piece;
   orienting a second piece of the at least one hollow member in the substantially chord-wise direction relative to the airflow over the leading edge, the first piece comprising a corrugated wave shape;
   bonding the second piece at nodes of the second piece to a second inner surface of the perforated panel skin with ridges of the second piece detached from the perforated panel skin;
   stiffening the second inner surface with the second piece;
   coupling the first piece to the second piece via a corrugated strap, the corrugated strap detached from an area of the inner surface near a tip of the leading edge, thereby providing no attachment to the perforated panel skin of the leading edge; and
   configuring a first passive aft-facing vent directly vented to an interior of the aerodynamic body at one end of the first piece and a second passive aft-facing vent directly vented to the interior of the aerodynamic body at one end of the second piece to passively suctioning air from an outer surface of the perforated panel skin through the perforated panel skin to the interior of the aerodynamic body such that the air flows along the first piece and the second piece respectively and out of the first passive aft-facing vent and the second passive aft-facing vent respectively.

17. The method according to claim 16, further comprising:
   bonding the first piece to the perforated panel skin via a first bond-line coupled to the first inner surface; and
   bonding the second piece to the perforated panel skin via a second bond-line coupled to the second inner surface.

18. The method according to claim 16, further comprising stiffening the leading edge of the aerodynamic body with the first piece and the second piece.

19. The method according to claim 16, further comprising:
   configuring the first passive aft-facing vent to flowing the air to a plenum chamber; and
   configuring the second passive aft-facing vent to flowing the air to the plenum chamber.

20. The method according to claim 16, wherein the at least one hollow member comprises one of: a braided carbon fiber-reinforced polymer, and CP-2 titanium.

* * * * *